United States Patent
Park et al.

(10) Patent No.: US 12,512,270 B2
(45) Date of Patent: Dec. 30, 2025

(54) MULTILAYERED CERAMIC CAPACITOR INCLUDING AN EXTERNAL ELECTRODE HAVING A NON-CONDUCTIVE RESIN LAYER AND A CONDUCTIVE RESIN LAYER

(71) Applicant: SAMSUNG ELECTRO-MECHANICS CO., LTD., Suwon-si (KR)

(72) Inventors: Hyejin Park, Suwon-si (KR); Byungwoo Kang, Suwon-si (KR); Sangwook Lee, Suwon-si (KR); Seung-Hun Han, Suwon-si (KR); Jungmin Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 93 days.

(21) Appl. No.: 18/584,402

(22) Filed: Feb. 22, 2024

(65) Prior Publication Data

US 2025/0166899 A1 May 22, 2025

(30) Foreign Application Priority Data

Nov. 16, 2023 (KR) .......... 10-2023-0158892

(51) Int. Cl.
*H01G 4/30* (2006.01)
*H01G 4/232* (2006.01)
*H01G 4/12* (2006.01)

(52) U.S. Cl.
CPC .......... *H01G 4/30* (2013.01); *H01G 4/2325* (2013.01); *H01G 4/12* (2013.01)

(58) Field of Classification Search
None
See application file for complete search history.

(56) References Cited

U.S. PATENT DOCUMENTS

| | | | | |
|---|---|---|---|---|
| 5,339,068 | A * | 8/1994 | Tsunoda | H01C 1/142 338/308 |
| 2013/0250480 | A1* | 9/2013 | Ahn | H01G 4/129 156/89.12 |
| 2019/0131076 | A1 | 5/2019 | Fukumjura | |
| 2020/0273621 | A1* | 8/2020 | Yi | H01G 4/248 |

(Continued)

FOREIGN PATENT DOCUMENTS

JP H08203770 A * 8/1996
KR 10-2019-0049479 A 5/2019

*Primary Examiner* — Eric W Thomas
(74) *Attorney, Agent, or Firm* — Morgan Lewis & Bockius LLP

(57) ABSTRACT

A disclosed multilayer ceramic capacitor includes: a ceramic main body; a plurality of first internal electrodes and a plurality of second internal electrodes that are disposed inside the ceramic main body; and a first external electrode and a second external electrode that are disposed outside the ceramic main body. Each of the first and second external electrodes includes an electrode layer disposed on an end surface of the body and electrically connected to the first or second internal electrodes, a non-conductive resin layer disposed on at least one surface connected to the end surface of the ceramic main body and in contact with the electrode layer, and a conductive resin layer covering at least a portion of the non-conductive resin layer.

20 Claims, 13 Drawing Sheets

(56) References Cited

U.S. PATENT DOCUMENTS

| | | |
|---|---|---|
| 2021/0074481 A1* | 3/2021 | Yi .......................... H01G 4/30 |
| 2021/0193391 A1* | 6/2021 | Yi .......................... H01G 4/008 |
| 2022/0037087 A1 | 2/2022 | Yi et al. |
| 2022/0139616 A1* | 5/2022 | Kang ..................... H01G 4/224 |
| | | 361/301.4 |

* cited by examiner

MULTILAYERED CERAMIC CAPACITOR INCLUDING AN EXTERNAL ELECTRODE HAVING A NON-CONDUCTIVE RESIN LAYER AND A CONDUCTIVE RESIN LAYER

CROSS-REFERENCE TO RELATED APPLICATION

The present application claims the benefit of priority to Korean Patent Application No. 10-2023-0158892, filed on Nov. 16, 2023 with the Korean Intellectual Property Office, the entire contents of which are incorporated herein by reference.

TECHNICAL FIELD

The present disclosure relates to a multilayer ceramic capacitor.

BACKGROUND

An electronic component that uses a ceramic material includes a capacitor, an inductor, a piezoelectric element, a varistor, a thermistor, or the like.

Among the ceramic electronic components, multilayer ceramic capacitors (MLCCs) may be used in various electronic devices due to its advantages of being small, having high-capacity, and being easy to mount.

For example, a multilayer ceramic capacitor may be mounted on substrates of various electronic products such as an imaging device such as a liquid crystal display device (LCD), a plasma display device panel (PDP), an organic light-emitting diode (OLED), or the like, a computer, a personal portable terminal, and a smartphone so that the multilayer ceramic capacitor is used as a chip-type condenser that plays a role in charging or discharging electricity therein or therefrom.

The multilayer ceramic capacitor may include an internal electrode disposed inside a ceramic main body and an external electrode that is disposed outside the ceramic main body and is connected to the internal electrode. If the external electrode is too thick, the volume occupied by the external electrode is large so that there is a problem in which an effective capacitance of the multilayer ceramic capacitor is reduced.

The information disclosed in the Background section above is to aid in the understanding of the background of the present disclosure, and should not be taken as acknowledgement that this information forms any part of prior art.

SUMMARY

One aspect of an embodiment is to provide a multilayer ceramic capacitor that includes an external electrode having a reduced volume.

However, problems to be solved by embodiments of the present disclosure are not limited to the above-described problem and may be variously extended in a range of a technical idea included in the present disclosure.

A multilayer ceramic capacitor according to an embodiment includes: a ceramic main body that includes a first surface and a second surface facing in a first direction, a third surface and a fourth surface facing in a second direction and connecting the first surface and the second surface, and a fifth surface and a sixth surface facing in a third direction and connecting the first surface and the second surface; a plurality of first internal electrodes and a plurality of second internal electrodes that are disposed inside the ceramic main body; and a first external electrode and a second external electrode that are disposed outside the ceramic main body. The first external electrode includes a first electrode layer disposed on the first surface of the ceramic main body and electrically connected to the plurality of first internal electrodes, a first non-conductive resin layer disposed on at least one of the third surface, the fourth surface, the fifth surface, or the sixth surface of the ceramic main body and in contact with the first electrode layer, and a first conductive resin layer covering at least a portion of the first non-conductive resin layer, and the second external electrode includes a second electrode layer disposed on the second surface of the ceramic main body and electrically connected to the plurality of second internal electrodes, a second non-conductive resin layer disposed on at least one of the third surface, the fourth surface, the fifth surface, or the sixth surface of the ceramic main body and in contact with the second electrode layer, and a second conductive resin layer covering at least a portion of the second non-conductive resin layer.

The first non-conductive resin layer may include a first end portion in contact with the first electrode layer, and a second end portion opposing the first end portion in the first direction, and the second non-conductive resin layer may include a third end portion in contact with the second electrode layer, and a fourth end portion opposing the third end portion in the first direction.

The first conductive resin layer may cover the first end portion and the second end portion of the first non-conductive resin layer, and the second conductive resin layer may cover the third end portion and the fourth end portion of the second non-conductive resin layer.

The first conductive resin layer may cover the first end portion of the first non-conductive resin layer and may expose the second end portion, and the second conductive resin layer may cover the third end portion of the second non-conductive resin layer and may expose the fourth end portion.

A length of the first non-conductive resin layer may be greater than a length of the first conductive resin layer, and a length of the second non-conductive resin layer may be greater than a length of the second conductive resin layer.

The first electrode layer may further include a first extension portion disposed on at least one of the third surface, the fourth surface, the fifth surface, or the sixth surface of the ceramic main body, and the second electrode layer may further include a second extension portion disposed on at least one of the third surface, the fourth surface, the fifth surface, or the sixth surface of the ceramic main body.

The first extension portion may be covered by the first non-conductive resin layer, and the second extension portion may be covered by the second non-conductive resin layer.

The first non-conductive resin layer may include a first end portion in contact with the first electrode layer, and a second end portion opposing the first end portion in the first direction, and the second non-conductive resin layer may include a third end portion in contact with the second electrode layer, and a fourth end portion opposing the third end portion in the first direction.

The first conductive resin layer may cover the second end portion of the first non-conductive resin layer, and the second conductive resin layer may cover the fourth end portion of the second non-conductive resin layer.

The first conductive resin layer may expose the second end portion of the first non-conductive resin layer, and the second conductive resin layer may expose the fourth end portion of the second non-conductive resin layer.

A length of the first non-conductive resin layer may be greater than a length of the first conductive resin layer, and a length of the second non-conductive resin layer may be greater than a length of the second conductive resin layer.

The first electrode layer may include copper (Cu) or nickel (Ni), and the second electrode layer may include copper (Cu) or nickel (Ni).

The first non-conductive resin layer may include epoxy, and the second non-conductive resin layer may include epoxy.

The first conductive resin layer may include a conductive metal and epoxy, and the second conductive resin layer may include a conductive metal and epoxy.

The first conductive resin layer may include an intermetallic compound and epoxy, and the second conductive resin layer may include an intermetallic compound and epoxy.

The multilayer ceramic capacitor may further include: a first plating layer covering at least a portion of the first external electrode; and a second plating layer covering at least a portion of the second external electrode.

The first plating layer may include a first layer disposed on the first external electrode and a second layer disposed on the first layer, and the second plating layer may include a third layer disposed on the second external electrode and a fourth layer disposed on the third layer.

The first layer and the third layer may include nickel (Ni), and the second layer and the fourth layer may include tin (Sn).

A multilayer ceramic capacitor according to another embodiment includes: a ceramic main body that includes a first surface and a second surface facing in a first direction, a third surface and a fourth surface facing in a second direction and connecting the first surface and the second surface, and a fifth surface and a sixth surface facing in a third direction and connecting the first surface and the second surface; a plurality of first internal electrodes and a plurality of second internal electrodes that are disposed inside the ceramic main body; a non-conductive resin layer that is disposed on at least one of the third surface, the fourth surface, the fifth surface, or the sixth surface of the ceramic main body; and a first external electrode and a second external electrode that are disposed outside the ceramic main body. The first external electrode includes a first electrode layer disposed on the first surface of the ceramic main body and electrically connected to the plurality of first internal electrodes, and a first conductive resin layer covering at least a portion of the non-conductive resin layer, and the second external electrode includes a second electrode layer disposed on the second surface of the ceramic main body and electrically connected to the plurality of second internal electrodes, and a second conductive resin layer covering at least a portion of the non-conductive resin layer.

The first electrode layer may further include a first extension portion disposed on at least one of the third surface, the fourth surface, the fifth surface, or the sixth surface of the ceramic main body and covered by the non-conductive resin layer, and the second electrode layer may further include a second extension portion disposed on at least one of the third surface, the fourth surface, the fifth surface, or the sixth surface of the ceramic main body and covered by the non-conductive resin layer.

According to the multilayer ceramic capacitor according to the embodiment, a portion contributing to capacitance may be increased by reducing a volume of an external electrode.

DETAILED DESCRIPTION OF THE EMBODIMENTS

Figure 1:
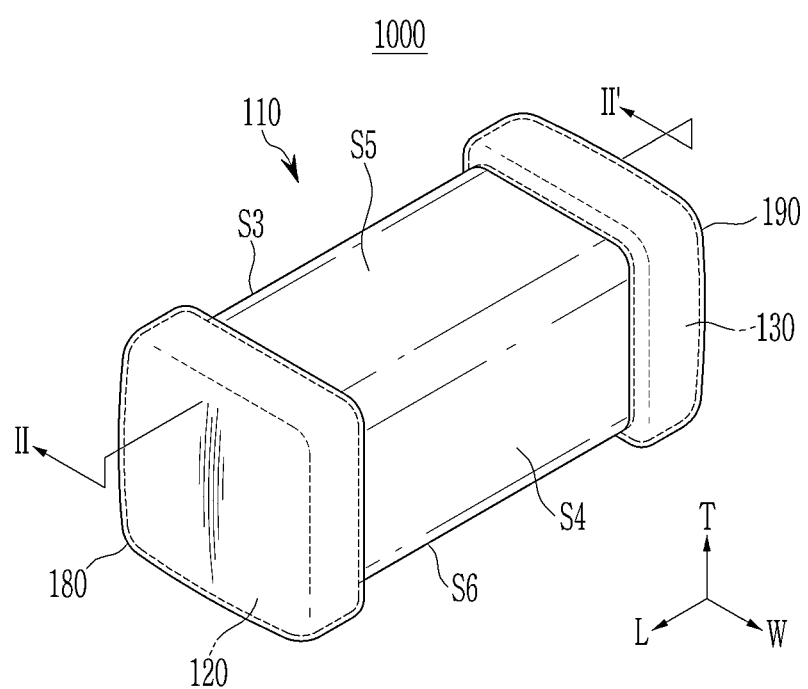
FIG. 1 is a perspective view schematically showing a multilayer ceramic capacitor according to an embodiment.

Hereinafter, various embodiment of the present disclosure will be described in detail so that a person of ordinary skill in the technical field to which the present disclosure belongs can easily implement it with reference to the accompanying drawings. In order to clearly describe the present disclosure, parts or portions that are irrelevant to the description are omitted in the drawings, and identical or similar constituent elements throughout the specification are denoted by the same reference numerals. In addition, some constituent elements in the accompanying drawings are exaggerated, omitted, or schematically illustrated, and the size of each constituent element does not fully reflect the actual size.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It will be understood that when an element such as a layer, film, region, area, or substrate is referred to as being "on" or "above" another element, it may be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

It will be further understood that terms "comprises/includes" or "have" used throughout the specification specify the presence of stated features, numerals, steps, operations, components, parts, or a combination thereof, but do not preclude the presence or addition of one or more other features, numerals, steps, operations, components, parts, or a combination thereof. Accordingly, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Furthermore, throughout the specification, "connected" does not only mean when two or more elements are directly connected, but also when two or more elements are indirectly connected through other elements, and when they are physically connected or electrically connected, and further, it may be referred to by different names depending on a position or function, and may also be referred to as a case in which respective parts that are substantially integrated are linked to each other.

Figure 2:
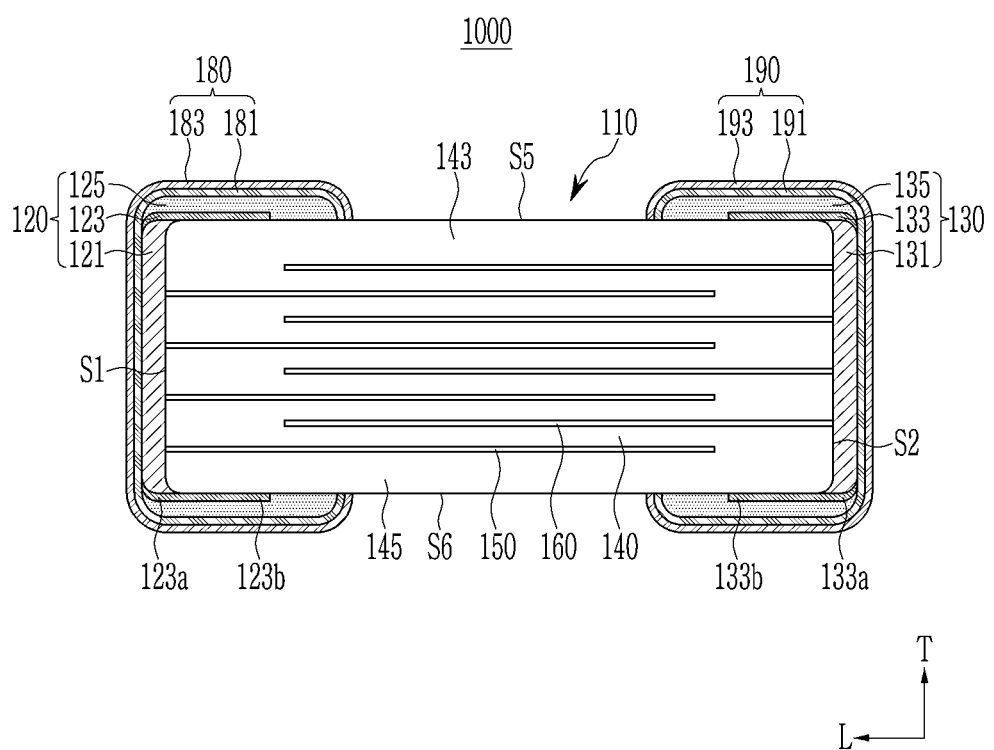
FIG. 2 is a cross-sectional view taken along line II-II' of FIG. 1.
Figure 3:
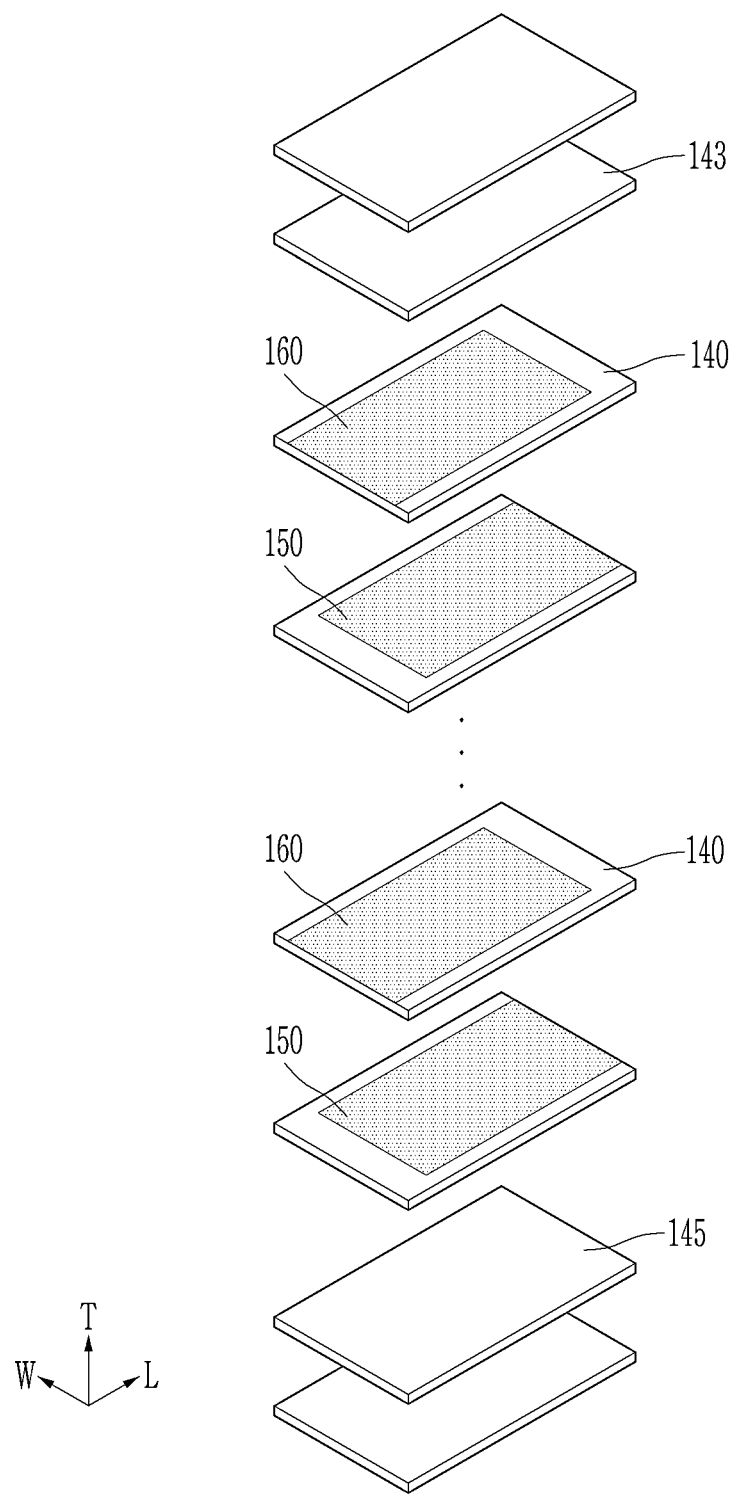
FIG. 3 is an exploded perspective view showing a stacked structure of internal electrodes in the multilayer ceramic capacitor of FIG. 1.

FIG. 1 is a perspective view schematically showing a multilayer ceramic capacitor according to an embodiment, FIG. 2 is a cross-sectional view taken along a line II-II' of FIG. 1, and FIG. 3 is an exploded perspective view showing a stacked structure of internal electrodes in the multilayer ceramic capacitor of FIG. 1.

Referring to FIG. 1, FIG. 2, and FIG. 3, the multilayer ceramic capacitor 1000 according to the present embodiment includes a ceramic main body 110, a first external electrode 120, a second external electrode 130, a plurality of first internal electrodes 150, and a plurality of second internal electrodes 160.

First, directions are defined to clearly describe the present embodiment. An L-axis, a W-axis, and a T-axis shown in the drawings represent a length direction, a width direction, and a thickness direction of the multilayer ceramic capacitor 1000, respectively.

The thickness direction (a T-axis direction) may be a direction perpendicular to a wide surface (a main surface) of a constituent element having a sheet shape. For example, the thickness direction (the T-axis direction) may be used as the same concept as a direction in which a dielectric layer 140 is stacked.

The length direction (an L-axis direction) may be a direction parallel to the wide surface (the main surface) of the constituent element having the sheet shape, and may be a direction that intersects (or is perpendicular to) the thickness direction (the T-axis direction). For example, the length direction (the L-axis direction) may be a direction in which the first external electrode 120 and the second external electrode 130 face each other.

The width direction (a W-axis direction) may be a direction parallel to the wide surface (the main surface) of the constituent element having the sheet shape, and may be a direction that simultaneously intersects (or is perpendicular to) the thickness direction (the T-axis direction) and the length direction (the L-axis direction).

The ceramic main body 110 may have an approximately hexahedral shape, but the present embodiment is not limited thereto. Due to shrinkage during sintering, the ceramic main body 110 may not have a complete hexahedral shape, but may have a substantially hexahedral shape. For example, the ceramic main body 110 may have an approximately rectangular parallelepiped shape, but a portion corresponding to a corner or a vertex may have a round shape.

For convenience of description of the present embodiment, surfaces facing each other in the length direction (the L-axis direction) are defined as a first surface S1 and a second surface S2, surfaces facing each other in the width direction (the W-axis direction) and connecting the first surface S1 and the second surface S2 are defined as a third surface S3 and a fourth surface S4, and surfaces facing each other in the thickness direction (the T-axis direction) and connecting the first surface S1 and the second surface S2 are defined as a fifth surface S5 and a sixth surface S6.

Therefore, a first direction that is a direction in which the first surface S1 and the second surface S2 face each other may be the length direction (the L-axis direction), and second and third directions perpendicular to the first direction and perpendicular to each other may be the thickness direction (the T-axis direction) and the width direction (the W-axis direction) or the width direction (the W-axis direction) and the thickness direction (the T-axis direction), respectively.

A length of the ceramic main body 110 may mean a maximum value among a plurality of lengths of line segments connecting two outermost boundary lines facing each other in the length direction (the L-axis direction) of the ceramic main body 110 shown in a photograph of a cross-section and parallel to the length direction (the L-axis direction). The photograph of the cross-section may be an optical microscope photograph or a scanning electron microscope (SEM) photograph of a length direction (L-axis direction)-thickness direction (T-axis direction) cross-section at a central portion of the ceramic main body 110 in the width direction (the W-axis direction). On the other hand, the length of the ceramic main body 110 may mean a minimum value among the plurality of lengths of line segments connecting the two outermost boundary lines facing each other in the length direction (the L-axis direction) of the ceramic main body 110 shown in the photograph of the cross-section and parallel to the length direction (the L-axis direction). On the other hand, the length of the ceramic main body 110 may mean an arithmetic average value of lengths of at least two line segments among the line segments connecting the two outermost boundary lines facing each other in the length direction (the L-axis direction) of the ceramic main body 110 shown in the photograph of the cross-section and parallel to the length direction (the L-axis direction).

A thickness of the ceramic main body 110 may mean a maximum value among a plurality of lengths of line segments connecting two outermost boundary lines facing each other in the thickness direction (the T-axis direction) of the ceramic main body 110 shown in the photograph of the cross-section and parallel to the thickness direction (the T-axis direction). The photograph of the cross-section may be the optical microscope photograph or the scanning electron microscope (SEM) photograph of the length direction (L-axis direction)-thickness direction (T-axis direction) cross-section at the central portion of the ceramic main body 110 in the width direction (the W-axis direction). On the other hand, the thickness of the ceramic main body 110 may mean a minimum value among the plurality of lengths of line segments connecting the two outermost boundary lines facing each other in the thickness direction (the T-axis direction) of the ceramic main body 110 shown in the photograph of the cross-section and parallel to the thickness direction (the T-axis direction). On the other hand, the thickness of the ceramic main body 110 may mean an arithmetic average value of lengths of at least two line segments among the line segments connecting the two outermost boundary lines facing each other in the thickness direction (the T-axis direction) of the ceramic main body 110 shown in the photograph of the cross-section and parallel to the thickness direction (the T-axis direction).

A width of the ceramic main body 110 may mean a maximum value among a plurality of lengths of line segments connecting two outermost boundary lines facing each other in the width direction (the W-axis direction) of the ceramic main body 110 shown in a photograph of a cross-section and parallel to the width direction (the W-axis direction). The photograph of the cross-section may be an optical microscope photograph or a scanning electron microscope (SEM) photograph of a length direction (L-axis direction)-width direction (W-axis direction) cross-section at a central portion of the ceramic main body 110 in the thickness direction (the T-axis direction). On the other hand, the width of the ceramic main body 110 may mean a minimum value among the plurality of lengths of line segments connecting the two outermost boundary lines facing each other in the width direction (the W-axis direction) of the ceramic main body 110 shown in the photograph of the cross-section and parallel to the width direction (the W-axis direction). On the other hand, the width of the ceramic main body 110 may mean an arithmetic average value of lengths of at least two line segments among the lengths of line segments connecting the two outermost boundary lines facing each other in the width direction (the W-axis direction) of the ceramic main body 110 shown in the photograph of the cross-section and parallel to the width direction (the W-axis direction).

The length, thickness and width of the ceramic main body 110 may be measured by a standard method that will be apparent to and understood by one of ordinary skill in the art.

The ceramic main body 110 may include a plurality of dielectric layers 140 stacked in the thickness direction (the T-axis direction). Boundaries between the dielectric layers 140 may be unclear. For example, it is difficult to observe the boundaries between the dielectric layers 140 without using a scanning electron microscope (SEM), and the plurality of dielectric layers 140 may appear to be an integral structure.

The first internal electrode 150 and the second internal electrode 160 may be alternately stacked with the dielectric layer 140 interposed therebetween. The stacked structure may repeat within the ceramic main body 110, the internal electrode closest to the fifth surface S5 of the ceramic main body 110 may be the first internal electrode 150 or the second internal electrode 160, and the internal electrode closest to the sixth surface S6 may be the first internal electrode 150 or the second internal electrode 160.

The first internal electrode 150 and the second internal electrode 160 may have different polarities, and may be electrically insulated from each other by the dielectric layer 140 disposed therebetween.

The first internal electrode 150 and the second internal electrode 160 may be disposed to offset from each other in the length direction (the L-axis direction) with the dielectric layer 140 interposed therebetween. One end of the first internal electrode 150 may be exposed through the first surface S1 of the ceramic main body 110, and one end of the second internal electrode 160 may be exposed through the second surface S2 of the ceramic main body 110. The end of the first internal electrode 150 exposed from the first surface S1 of the ceramic main body 110 may be connected to the first external electrode 120. The end of the second internal electrode 160 exposed from the second surface S2 of the ceramic main body 110 may be connected to the second external electrode 130.

The first internal electrode 150 and the second internal electrode 160 may be formed by printing a conductive paste that includes a conductive metal on a surface of the dielectric layer 140. For example, a conductive paste that includes nickel (Ni) or a nickel (Ni) alloy may be printed on the surface of the dielectric layer using screen printing or gravure printing to form the internal electrode. However, the present embodiment is not limited thereto.

For example, average thicknesses of the first internal electrode 150 and the second internal electrode 160 may be approximately 0.1 µm or more and 2 µm or less.

Here, the thickness of the internal electrode may mean an average thickness of one internal electrode disposed between two dielectric layers. The average thickness of the internal electrode may be an arithmetic average value of the values measured at 30 equally spaced points on one internal electrode shown in a scanning electron microscope (SEM) photograph at 10,000 magnification of a cross-section taken in the length direction (L-axis direction)-thickness direction (T-axis direction) at a central portion of the ceramic main body 110 in the width direction (the W-axis direction). The 30 points may be designated in an active region to be described later. By measuring the average thickness of each of ten internal electrodes using the above-described method and then deriving an arithmetic average value of the measurements, the average thickness of the internal electrode may be further generalized. The thickness of the internal electrode may be measured by a standard method that will be apparent to and understood by one of ordinary skill in the art.

If a voltage is applied to the first external electrode 120 and the second external electrode 130, an electric charge accumulates between the first internal electrode 150 and the second internal electrode 160 that face each other. That is, capacitance may be obtained between the first internal electrode 150, which is electrically connected to the first external electrode 120, and the second internal electrode 160, which is electrically connected to the second external electrode 130. Capacitance of the multilayer ceramic capacitor 1000 is proportional to an overlapped area of the first internal electrode 150 and the second internal electrode 160 that overlap each other along the thickness direction (the T-axis direction).

In other words, the multilayer ceramic capacitor 1000 may include an active region and a margin region. The active region may refer to a region where the first internal electrode 150 and the second internal electrode 160 overlap along the thickness direction (the T-axis direction), and the margin region may refer to a region between the active region and the first surface S1 of the ceramic main body 110 and a region between the active region and the second surface S2 of the ceramic main body 110.

The multilayer ceramic capacitor 1000 is categorized based on a length and a width thereof. Therefore, even in multilayer ceramic capacitors with the same length or width, a size of the ceramic main body may vary depending on a thickness of the external electrode. That is, the multilayer ceramic capacitor with a thinner external electrode may have a larger ceramic main body compared with the multilayer ceramic capacitor with a thicker external electrode. A larger ceramic main body may mean a larger active region, which in turn may mean a larger capacitance. As a result, as the external electrode of the multilayer ceramic capacitor becomes thinner, the capacitance may increase. In the present embodiment, by forming a thin electrode layer on the first surface and the second surface of the ceramic main body, the thickness of the external electrode may be reduced and a corresponding advantageous effect may be obtained. This will be described in more detail below.

A first cover layer 143 and a second cover layer 145 may be disposed outside the active region in the thickness direction (the T-axis direction).

The first cover layer 143 is disposed between the fifth surface S5 of the ceramic main body 110 and the internal electrode closest to the fifth surface S5 of the ceramic main body 110. The second cover layer 145 is disposed between the sixth surface S6 of the ceramic main body 110 and the internal electrode closest to the sixth surface S6 of the ceramic main body 110.

That is, within the ceramic main body 110, the first cover layer 143 may be disposed at an upper portion of an uppermost internal electrode, and the second cover layer 145 may be disposed at a lower portion of a lowermost internal electrode. The first cover layer 143 and the second cover layer 145 may have the same composition as that of the dielectric layer 140. The first cover layer 143 and the second cover layer 145 may be formed by stacking one or more dielectric layers on an outer surface of the uppermost internal electrode and an outer surface of the lowermost internal electrode, respectively.

The first cover layer 143 and the second cover layer 145 may serve to prevent damage to the first internal electrode 150 and the second internal electrode 160 by a physical or chemical stress.

The dielectric layer 140 may include a ceramic material of a high permittivity. For example, the ceramic material may include a dielectric ceramic comprising components such as $BaTiO_3$, $CaTiO_3$, $SrTiO_3$, $CaZrO_3$. The component may further include an auxiliary component such as a manganese (Mn) compound, an iron (Fe) compound, a chromium (Cr) compound, a cobalt (Co) compound, a nickel (Ni) compound, or the like. For example, the dielectric layer includes $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like is partially dissolved into $BaTiO_3$, but the present disclosure is not limited thereto.

Additionally, the dielectric layer 140 may further include one or more of a ceramic additive, an organic solvent, a plasticizer, a binder, and a dispersant. For example, the ceramic additive may be transition metal oxide or carbide, a rare earth element, magnesium (Mg), aluminum (Al), or the like.

As an example, an average thickness of the dielectric layer 140 may be 0.1 μm to 10 μm, but the present embodiment is not limited thereto.

The first external electrode 120 and the second external electrode 130 are disposed outside the ceramic main body 110.

The first external electrode 120 may be disposed on the first surface S1 of the ceramic main body 110, and may extend onto at least one of the third surface S3, the fourth surface S4, the fifth surface S5, or the sixth surface S6. The second external electrode 130 may be disposed on the second surface S2 of the ceramic main body 110, and may extend onto at least one of the third surface S3, the fourth surface S4, the fifth surface S5, or the sixth surface S6.

The first external electrode 120 includes a first electrode layer 121, a first non-conductive resin layer 123, and a first conductive resin layer 125.

The first electrode layer 121 may cover the first surface S1 of the ceramic main body 110, and is electrically connected to the exposed ends of the plurality of first internal electrodes 150.

The first electrode layer 121 may be formed by transferring a sheet including a conductive metal (e.g., copper (Cu) or nickel (Ni)) to the first surface S1 of the ceramic main body 110. A thickness of the first electrode layer 121 formed using the above-described method may be formed thinner than that of the first electrode layer formed using a conventional dipping method. Therefore, the first external electrode 120 may become relatively thin. Accordingly, the ceramic main body 110 may become relatively large and the area of the internal electrode increases, thereby increasing the capacitance.

Meanwhile, the sheet including the conductive metal may be transferred to the first surface S1 of the ceramic main body 110 to form the first electrode layer 121, and therefore the first electrode layer 121 may not be disposed on the third surface S3, the fourth surface S4, the fifth surface S5, and the sixth surface S6 of the ceramic main body 110.

The first non-conductive resin layer 123 may be in contact with the first electrode layer 121, and covers portions of the third surface S3, the fourth surface S4, the fifth surface S5, and the sixth surface S6 of the ceramic main body 110.

The first non-conductive resin layer 123 may include a first end portion 123a in contact with the first electrode layer 121, and a second end portion 123b opposing the first end portion 123a in the length direction (the L-axis direction). The first end portion 123a may cover an end portion of the first electrode layer 121 in the thickness direction (the T-axis direction).

A portion of the first non-conductive resin layer 123 may be in direct contact with the third surface S3, the fourth surface S4, the fifth surface S5, and the sixth surface S6.

The first non-conductive resin layer 123 may be made of a material that is insulating and stretchable. For example, the first non-conductive resin layer 123 may include various polymers that do not include a metal and have a low elastic modulus. Accordingly, the first non-conductive resin layer 123 may have high elasticity. Therefore, when a drop impact or a flex stress (or a bending stress) of a mounting substrate occurs, the first non-conductive resin layer 123 may absorb the stress, thereby suppressing the occurrence of flex cracks in the multilayer ceramic capacitor.

For example, a resin included in the first non-conductive resin layer 123 may be various known thermosetting resins such as an epoxy resin, a phenol resin, a urethane resin, a silicon resin, a polyimide resin, and the like. It is preferable to use the epoxy resin which has excellent heat resistance, moisture resistance, adhesion, and the like.

After the first electrode layer 121 is formed on the first surface S1 of the ceramic main body 110, the first non-conductive resin layer 123 may be formed. That is, after the first electrode layer 121 is formed, a non-conductive epoxy paste with a low elastic modulus may be applied to the first surface S1, the third surface S3, the fourth surface S4, the fifth surface S5, and the sixth surface S6 of the ceramic main body 110, and then the non-conductive epoxy paste on the first surface S1 is removed to form the first non-conductive resin layer 123. For example, after the non-conductive epoxy paste on the first surface S1 of the ceramic main body 110 is removed using a non-woven fabric, a curing heat treatment may be performed to form the first non-conductive resin layer 123 on the third surface S3, the fourth surface S4, the fifth surface S5, and the sixth surface S6. Accordingly, the first electrode layer 121 may be disposed on the first surface S1 of the ceramic main body 110, and the first non-conductive resin layer 123 may be disposed on the third surface S3, the fourth surface S4, the fifth surface S5, and the sixth surface S6.

Meanwhile, the first non-conductive resin layer 123 may include a filler for applicability and shape retention. The filler may be a material with no or very low conductivity, and for example, the filler may include glass powder or silica.

The first conductive resin layer 125 may cover the first non-conductive resin layer 123, and cover portions of the third surface S3, the fourth surface S4, the fifth surface S5, and the sixth surface S6 of the ceramic main body 110.

For example, the first end portion 123a and the second end portion 123b of the first non-conductive resin layer 123 may be covered by the first conductive resin layer 125 and not exposed to the outside. In this embodiment, a portion of the first conductive resin layer 125 may be in direct contact with the third surface S3, the fourth surface S4, the fifth surface S5, and the sixth surface S6 of the ceramic main body 110.

The first conductive resin layer 125 may be made of a material that is conductive and stretchable. For example, the first conductive resin layer 125 may include a conductive metal or an intermetallic compound, and may include various polymers with a low elastic modulus.

For example, a resin included in the first conductive resin layer 125 may be various known thermosetting resins such as an epoxy resin, a phenol resin, a urethane resin, a silicon resin, a polyimide resin, and the like. It is preferable to use the epoxy resin which has excellent heat resistance, moisture resistance, adhesion, and the like.

Meanwhile, the first conductive resin layer 125 may include a conductive metal as a filler. For example, the filler may include copper (Cu), silver (Ag), nickel (Ni), tin (Sn), or an alloy thereof.

After the first non-conductive resin layer 123 is formed on the third surface S3, the fourth surface S4, the fifth surface S5, and the sixth surface S6 of the ceramic main body 110, the first conductive resin layer 125 may be formed. That is, after the first non-conductive resin layer 123 is formed, a conductive epoxy paste may be applied to the first surface S1, the third surface S3, the fourth surface S4, the fifth surface S5, and the sixth surface S6 of the ceramic main body 110, and then the conductive epoxy paste on the first surface S1 may be removed to form the first conductive resin layer 125. For example, after the conductive epoxy paste on the first surface S1 of the ceramic main body 110 is removed using an adhesive sheet, a curing heat treatment may be performed to form the first conductive resin layer 125 on the third surface S3, the fourth surface S4, the fifth surface S5, and the sixth surface S6. Therefore, the first electrode layer 121 may be disposed on the first surface S1 of the ceramic main body 110, and the first non-conductive resin layer 123 and the first conductive resin layer 125 may be disposed on the third surface S3, the fourth surface S4, the fifth surface S5, and the sixth surface S6.

Unlike the present embodiment, if both the electrode layer and the resin layer that covers the electrode layer are disposed on the first surface S1 of the ceramic main body 110, the resin layer may have lower electrical connectivity than the electrode layer, which may cause a problem in which equivalent series resistance (ESR) of the first external electrode increases. During a high temperature reflow process, there is a risk of lifting due to out-gassing from the resin layer. Furthermore, since there is a resin layer on the electrode layer, a thickness of the external electrode is larger and a relative volume of the ceramic main body is smaller than in the case when only the electrode layer exists, causing a problem in which an effective capacitance of the multilayer ceramic capacitor is reduced.

However, according to the present embodiment, the first electrode layer 121 is disposed on the first surface S1 of the ceramic main body 110, and the first non-conductive resin layer 123 and the first conductive resin layer 125 are not disposed on the first surface S1, so the above-mentioned problem may not occur.

The second external electrode 130 includes a second electrode layer 131, a second non-conductive resin layer 133, and a second conductive resin layer 135.

The second electrode layer 131 may cover the second surface S2 of the ceramic main body 110, and is electrically connected to the exposed ends of the plurality of second internal electrodes 160.

The second non-conductive resin layer 133 may be in contact with the second electrode layer 131, and cover portions of the third surface S3, the fourth surface S4, the fifth surface S5, and the sixth surface S6 of the ceramic main body 110.

The second non-conductive resin layer 133 may include a first end portion 133a in contact with the second electrode layer 131, and a second end portion 133b opposing the first end portion 133a in the length direction (the L-axis direction). The first end portion 133a may cover an end portion of the second electrode layer 131 in the thickness direction (the T-axis direction).

The second conductive resin layer 135 may cover the second non-conductive resin layer 133, and cover portions of the third surface S3, the fourth surface S4, the fifth surface S5, and the sixth surface S6 of the ceramic main body 110.

For example, the first end portion 133a and the second end portion 133b of the second non-conductive resin layer 133 may be covered by the second conductive resin layer 135 and not exposed to the outside. In this embodiment, a portion of the second conductive resin layer 135 may be in direct contact with the third surface S3, the fourth surface S4, the fifth surface S5, and the sixth surface S6 of the ceramic main body 110.

The second external electrode 130 correspond to the structure, material, and function of the first external electrode 120, except for its location, and thus a repeated description thereof will be omitted.

Meanwhile, the multilayer ceramic capacitor 1000 may further include a first plating layer 180 and a second plating layer 190.

The first plating layer 180 may cover the first external electrode 120. As shown in FIG. 2, the first plating layer 180 may cover an end portion of the first conductive resin layer 125 such that the first conductive resin layer 125 may not be exposed. The first plating layer 180 may include a first layer 181 and a second layer 183. The first layer 181 may be disposed on the first external electrode 120, and the second layer 183 may be disposed on the first layer 181. The first layer 181 may include nickel (Ni) and the second layer 183 may include tin (Sn), but the present embodiment is not limited thereto.

In one embodiment, both of the first non-conductive resin layer 123 and the first conductive resin layer 125 may have an opening on the first surface S1 of the ceramic main body 110, such that the first plating layer 180 may be in direct contact with the first electrode layer 121.

The second plating layer 190 may cover the second external electrode 130. As shown in FIG. 2, the second plating layer 190 may cover an end portion of the second conductive resin layer 135 such that the first conductive resin layer 135 may not be exposed. The second plating layer 190 may include a first layer 191 and a second layer 193. The first layer 191 may be disposed on the second external electrode 130, and the second layer 193 may be disposed on the first layer 191. The first layer 191 may include nickel (Ni) and the second layer 193 may include tin (Sn), but the present embodiment is not limited thereto.

In one embodiment, both of the second non-conductive resin layer 133 and the second conductive resin layer 135 may have an opening on the second surface S2 of the ceramic main body 110, such that the second plating layer 190 may be in direct contact with the second electrode layer 131.

Figure 4:
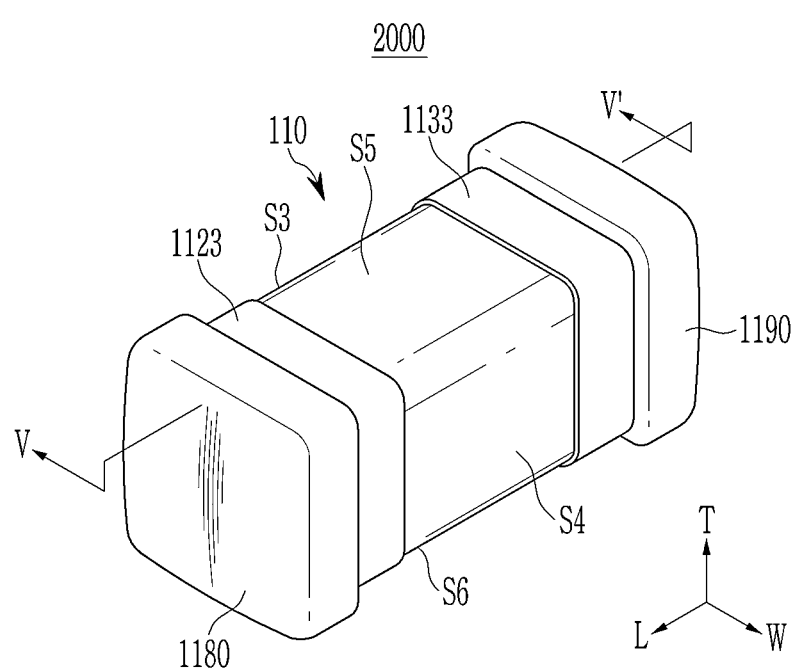
FIG. 4 is a perspective view schematically showing a multilayer ceramic capacitor according to another embodiment.
Figure 5:
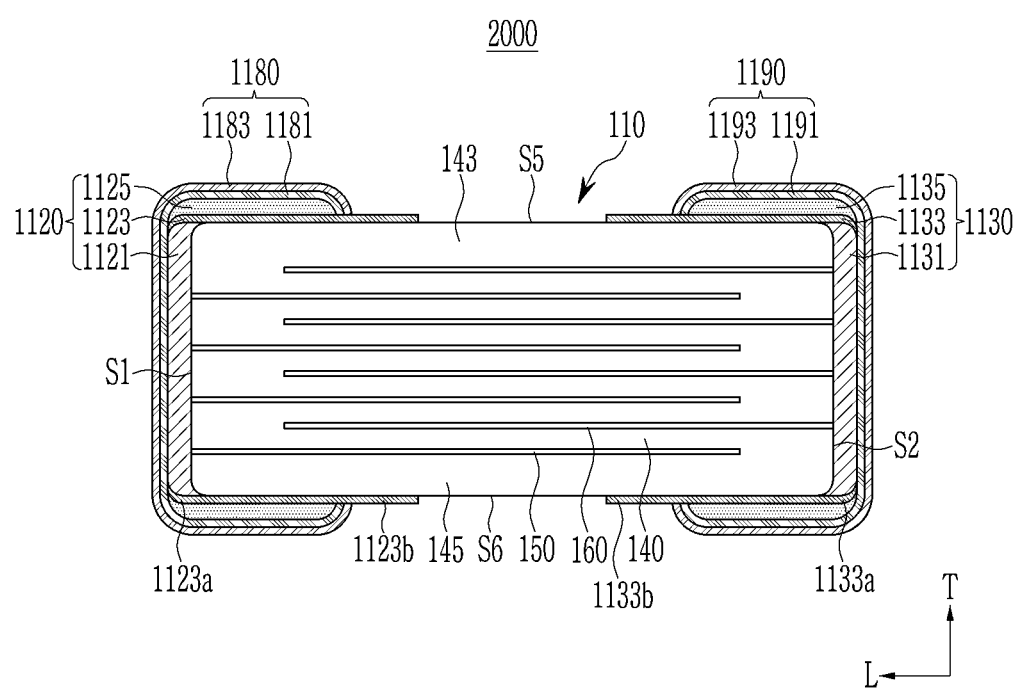
FIG. 5 is a cross-sectional view taken along line V-V' of FIG. 4.

FIG. 4 is a perspective view schematically showing a multilayer ceramic capacitor according to another embodiment, and FIG. 5 is a cross-sectional view taken along line V-V' of FIG. 4.

Referring to FIG. 4 and FIG. 5, the multilayer ceramic capacitor 2000 includes a ceramic main body 110, a first external electrode 1120, a second external electrode 1130, a plurality of first internal electrodes 150, and a plurality of second internal electrodes 160. With the exception of the structure of the first external electrode 1120 and the second external electrode 1130 of the multilayer ceramic capacitor 2000, the remaining components are the same as or correspond to the components of the multilayer ceramic capacitor 1000 of FIG. 1, so a repeated description thereof will be omitted.

The first external electrode 1120 may be disposed on the first surface S1 of the ceramic main body 110, and may extend to the third surface S3, the fourth surface S4, the fifth surface S5, and the sixth surface S6. The second external electrode 1130 may be disposed on the second surface S2 of the ceramic main body 110, and may extend to the third surface S3, the fourth surface S4, the fifth surface S5, and the sixth surface S6.

The first external electrode 1120 includes a first electrode layer 1121, a first non-conductive resin layer 1123, and a first conductive resin layer 1125.

The first electrode layer 1121 covers the first surface S1 of the ceramic main body 110, and is electrically connected to the exposed ends of the plurality of first internal electrodes 150.

The first non-conductive resin layer 1123 is in contact with the first electrode layer 1121, and covers portions of the third surface S3, the fourth surface S4, the fifth surface S5, and the sixth surface S6 of the ceramic main body 110.

The first non-conductive resin layer 1123 may include a first end portion 1123a that is in contact with the first electrode layer 1121 and a second end portion 1123b opposing the first end portion 1123a in the length direction (the L-axis direction). The first end portion 1123a may cover an end portion of the first electrode layer 1121 in the thickness direction (the T-axis direction).

The first conductive resin layer 1125 covers a portion of the first non-conductive resin layer 1123.

The first end portion 1123a of the first non-conductive resin layer 1123 may be covered by the first conductive resin layer 1125 and not exposed to the outside, but the second end portion 1123b of the first non-conductive resin layer 1123 may not be covered by the first conductive resin layer 1125 and may be exposed to the outside.

Additionally, a length of the first non-conductive resin layer 1123 may be greater than a length of the first conductive resin layer 1125. Here, the length of the first non-conductive resin layer 1123 and the length of the first conductive resin layer 1125 are measured based on an optical microscope photograph or a scanning electron microscope (SEM) photograph of a cross-section taken in the length direction (L-axis direction)-thickness direction (T-axis direction) at a central portion of the multilayer ceramic capacitor 1000 in the width direction (the W-axis direction). The length of the first non-conductive resin layer 1123 may mean a maximum value among a plurality of lengths of line segments connecting two outermost boundary lines facing each other in the length direction (the L-axis direction) of the first non-conductive resin layer 1123 shown in the photograph of the cross-section and parallel to the length direction (the L-axis direction). In addition, the length of the first conductive resin layer 1125 may mean a maximum value among a plurality of lengths of line segments connecting two outermost boundary lines facing each other in the length direction (the L-axis direction) of the first conductive resin layer 1125 shown in the photograph of the cross-section and parallel to the length direction (the L-axis direction).

The second external electrode 1130 includes a second electrode layer 1131, a second non-conductive resin layer 1133, and a second conductive resin layer 1135.

The second electrode layer 1131 covers the second surface S2 of the ceramic main body 110, and is electrically connected to the exposed ends of the plurality of second internal electrodes 160.

The second non-conductive resin layer 1133 is in contact with the second electrode layer 1131, and covers portions of the third surface S3, the fourth surface S4, the fifth surface S5, and the sixth surface S6 of the ceramic main body 110.

The second conductive resin layer 1135 covers a portion of the second non-conductive resin layer 1133.

A first end portion 1133a of the second non-conductive resin layer 1133 may be covered by the second conductive resin layer 1135 and not exposed to the outside, but a second end portion 1133b of the second non-conductive resin layer 1133 may not be covered by the second conductive resin layer 1135 and may be exposed to the outside.

The second end portion 1123b of the first non-conductive resin layer 1123 may be spaced apart from the second end portion 1133b of the second non-conductive resin layer 1133.

The second external electrode 1130 corresponds to the structure, material, and function of the first external electrode 1120 except for its location, and thus a repeated description thereof will be omitted.

Meanwhile, the multilayer ceramic capacitor 2000 may further include a first plating layer 1180 and a second plating layer 1190.

The first plating layer 1180 covers a portion of the first external electrode 1120. The first plating layer 1180 may include a first layer 1181 and a second layer 1183. The first layer 1181 may be disposed on the first external electrode 1120, and the second layer 1183 may be disposed on the first layer 1181. The first layer 1181 may completely cover the first electrode layer 1121 and the first conductive resin layer 1125, but the first layer 1181 may expose a portion of the first non-conductive resin layer 1123 without covering the portion of the first non-conductive resin layer 1123. The second layer 1183 may completely cover the first layer 1181, but the second layer 1183 may expose a portion of the first non-conductive resin layer 1123 without covering the portion of the first non-conductive resin layer 1123. The first layer 1181 may include nickel (Ni) and the second layer 1183 may include tin (Sn), but the present embodiment is not limited thereto.

The second plating layer 1190 covers a portion of the second external electrode 1130. The second plating layer 1190 may include a first layer 1191 and a second layer 1193. The first layer 1191 may be disposed on the second external electrode 1130, and the second layer 1193 may be disposed on the first layer 1191. The first layer 1191 may completely cover the second electrode layer 1131 and the second conductive resin layer 1135, but the first layer 1191 may expose a portion of the second non-conductive resin layer 1133 without covering the portion of the second non-conductive resin layer 1133. The second layer 1193 may completely cover the first layer 1191, but the second layer 1193 may expose a portion of the second non-conductive resin layer 1133 without covering the portion of the second non-conductive resin layer 1133. The first layer 1191 may include nickel (Ni) and the second layer 1193 may include tin (Sn), but the present embodiment is not limited thereto.

Figure 6:
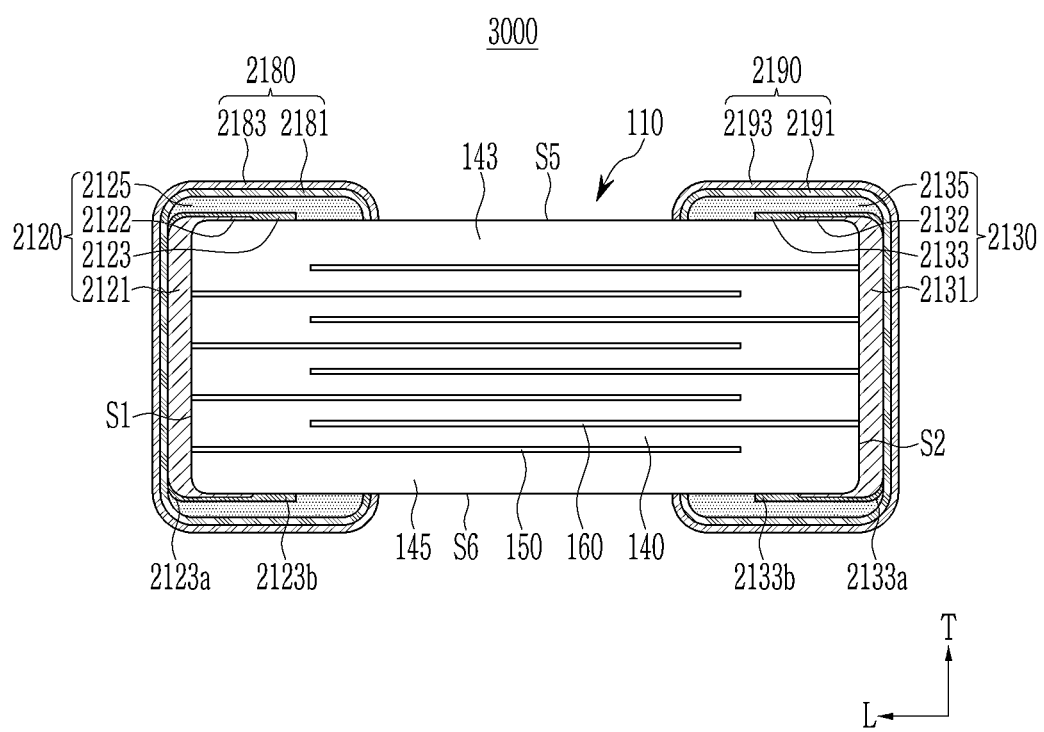
FIG. 6 is a cross-sectional view schematically showing a multilayer ceramic capacitor according to another embodiment.

FIG. 6 is a cross-sectional view schematically showing a multilayer ceramic capacitor according to another embodiment.

Referring to FIG. 6, the multilayer ceramic capacitor 3000 includes a ceramic main body 110, a first external electrode 2120, a second external electrode 2130, a plurality of first internal electrodes 150, and a plurality of second internal electrodes 160. With the exception of the structure of the first external electrode 2120 and the second external electrode 2130 of the multilayer ceramic capacitor 3000, the remaining components are the same as or correspond to the components of the multilayer ceramic capacitor 1000 of FIG. 1, so a repeated description thereof will be omitted.

The first external electrode 2120 may be disposed on the first surface S1 of the ceramic main body 110, and may extend onto at least one of the third surface S3, the fourth surface S4, the fifth surface S5, or the sixth surface S6. The second external electrode 2130 may be disposed on the second surface S2 of the ceramic main body 110, and may extend onto at least one of the third surface S3, the fourth surface S4, the fifth surface S5, or the sixth surface S6.

The first external electrode 2120 includes a first electrode layer 2121, a first non-conductive resin layer 2123, and a first conductive resin layer 2125.

The first electrode layer 2121 covers the first surface S1 of the ceramic main body 110, and is electrically connected to the exposed ends of the plurality of first internal electrodes 150. The first electrode layer 2121 may further include a first extension portion 2122 disposed on at least one of the third surface S3, the fourth surface S4, the fifth surface S5, or the sixth surface S6 of the ceramic main body 110. That is, the first electrode layer 2121 may have a shape extending from the first surface S1 of the ceramic main body 110 to at least one of the third surface S3, the fourth surface S4, the fifth surface S5, or the sixth surface S6.

The first non-conductive resin layer 2123 covers the first extension portion 2122 of the first electrode layer 2121, and covers portions of the third surface S3, the fourth surface S4, the fifth surface S5, and the sixth surface S6 of the ceramic main body 110.

The first non-conductive resin layer 2123 may include a first end portion 2123*a* that covers the first extension portion 2122 and a second end portion 2123*b* opposing the first end portion 2123*a* in the length direction (the L-axis direction).

The first conductive resin layer 2125 covers the first non-conductive resin layer 2123, and covers portions of the third surface S3, the fourth surface S4, the fifth surface S5, and the sixth surface S6 of the ceramic main body 110.

The first end portion 2123*a* and the second end portion 2123*b* of the first non-conductive resin layer 2123 may be covered by the first conductive resin layer 2125 and not exposed to the outside.

The second external electrode 2130 includes a second electrode layer 2131, a second non-conductive resin layer 2133, and a second conductive resin layer 2135.

The second electrode layer 2131 covers the second surface S2 of the ceramic main body 110, and is electrically connected to the exposed ends of the plurality of second internal electrodes 160. The second electrode layer 2131 may further include a second extension portion 2132 disposed on at least one of the third surface S3, the fourth surface S4, the fifth surface S5, or the sixth surface S6 of the ceramic main body 110. That is, the second electrode layer 2131 may have a shape extending from the second surface S2 of the ceramic main body 110 to at least one of the third surface S3, the fourth surface S4, the fifth surface S5, or the sixth surface S6.

The second non-conductive resin layer 2133 covers the second extension portion 2132 of the second electrode layer 2131, and covers portions of the third surface S3, the fourth surface S4, the fifth surface S5, and the sixth surface S6 of the ceramic main body 110.

A first end portion 2133*a* and a second end portion 2133*b* of the second non-conductive resin layer 2133 may be covered by the second conductive resin layer 2135 and not exposed to the outside.

The second external electrode 2130 corresponds to the structure, material, and function of the first external electrode 2120 except for its location, and thus a repeated description thereof will be omitted.

Meanwhile, the multilayer ceramic capacitor 3000 may further include a first plating layer 2180 and a second plating layer 2190.

Figure 7:
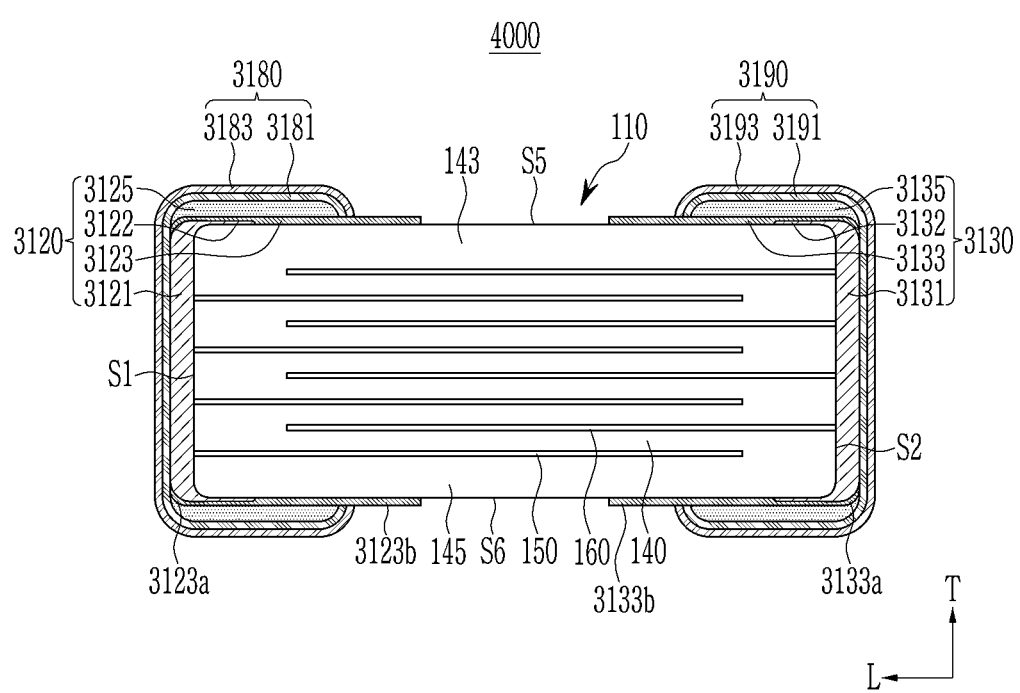
FIG. 7 is a cross-sectional view schematically showing a multilayer ceramic capacitor according to another embodiment.

FIG. 7 is a cross-sectional view schematically showing a multilayer ceramic capacitor according to another embodiment.

Referring to FIG. 7, the multilayer ceramic capacitor 4000 includes a ceramic main body 110, a first external electrode 3120, a second external electrode 3130, a plurality of first internal electrodes 150, and a plurality of second internal electrodes 160. With the exception of the structure of the first external electrode 3120 and the second external electrode 3130 of the multilayer ceramic capacitor 4000, the remaining components are the same as or correspond to the components of the multilayer ceramic capacitor 1000 of FIG. 1, so a repeated description thereof will be omitted.

The first external electrode 3120 may be disposed on the first surface S1 of the ceramic main body 110, and may extend onto at least one of the third surface S3, the fourth surface S4, the fifth surface S5, or the sixth surface S6. The second external electrode 3130 may be disposed on the second surface S2 of the ceramic main body 110, and may extend onto at least one of the third surface S3, the fourth surface S4, the fifth surface S5, or the sixth surface S6.

The first external electrode 3120 includes a first electrode layer 3121, a first non-conductive resin layer 3123, and a first conductive resin layer 3125.

The first electrode layer 3121 covers the first surface S1 of the ceramic main body 110, and is a portion that is electrically connected to the exposed ends of the plurality of first internal electrodes 150. The first electrode layer 3121 may further include a first extension portion 3122 disposed on at least one of the third surface S3, the fourth surface S4, the fifth surface S5, or the sixth surface S6 of the ceramic main body 110. That is, the first electrode layer 3121 may have a shape extending from the first surface S1 of the ceramic main body 110 to at least one of the third surface S3, the fourth surface S4, the fifth surface S5, or the sixth surface S6.

The first non-conductive resin layer 3123 covers the first extension portion 3122 of the first electrode layer 3121, and covers portions of the third surface S3, the fourth surface S4, the fifth surface S5, and the sixth surface S6 of the ceramic main body 110.

The first non-conductive resin layer 3123 may include a first end portion 3123a that covers the first extension portion 3122 and a second end portion 3123b opposing the first end portion 3123a in the length direction (the L-axis direction).

The first conductive resin layer 3125 covers a portion of the first non-conductive resin layer 3123.

The first end portion 3123a of the first non-conductive resin layer 3123 may be covered by the first conductive resin layer 3125 and not exposed to the outside, but the second end portion 3123b of the first non-conductive resin layer 3123 may not be covered by the first conductive resin layer 3125 and may be exposed to the outside.

Additionally, a length of the first non-conductive resin layer 3123 may be greater than a length of the first conductive resin layer 3125.

The second external electrode 3130 includes a second electrode layer 3131, a second non-conductive resin layer 3133, and a second conductive resin layer 3135.

The second electrode layer 3131 covers the second surface S2 of the ceramic main body 110, and is electrically connected to the exposed ends of the plurality of second internal electrodes 160. The second electrode layer 3131 may further include a second extension portion 3132 disposed on at least one of the third surface S3, the fourth surface S4, the fifth surface S5, or the sixth surface S6 of the ceramic main body 110. That is, the second electrode layer 3131 may have a shape extending from the first surface S1 of the ceramic main body 110 to at least one of the third surface S3, the fourth surface S4, the fifth surface S5, or the sixth surface S6.

The second non-conductive resin layer 3133 covers the second extension portion 3132 of the second electrode layer 3131, and covers portions of the third surface S3, the fourth surface S4, the fifth surface S5, and the sixth surface S6 of the ceramic main body 110.

The second conductive resin layer 3135 covers a portion of the second non-conductive resin layer 3133.

A first end portion 3133a of the second non-conductive resin layer 3133 may be covered by the second conductive resin layer 3135 and not exposed to the outside, but a second end 3133b of the second non-conductive resin layer 3133 may not be covered by the second conductive resin layer 3135 and may be exposed to the outside.

The second external electrode 3130 corresponds to the structure, material, and function of the first external electrode 3120 except for its location, and thus a repeated description thereof will be omitted.

Meanwhile, the multilayer ceramic capacitor 4000 may further include a first plating layer 3180 and a second plating layer 3190.

Figure 8:
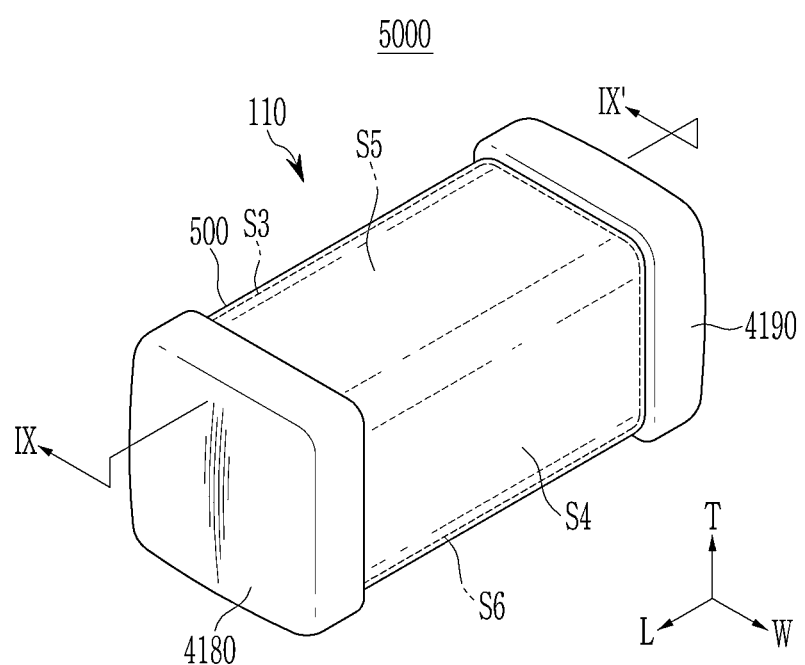
FIG. 8 is a perspective view schematically showing a multilayer ceramic capacitor according to another embodiment.
Figure 9:
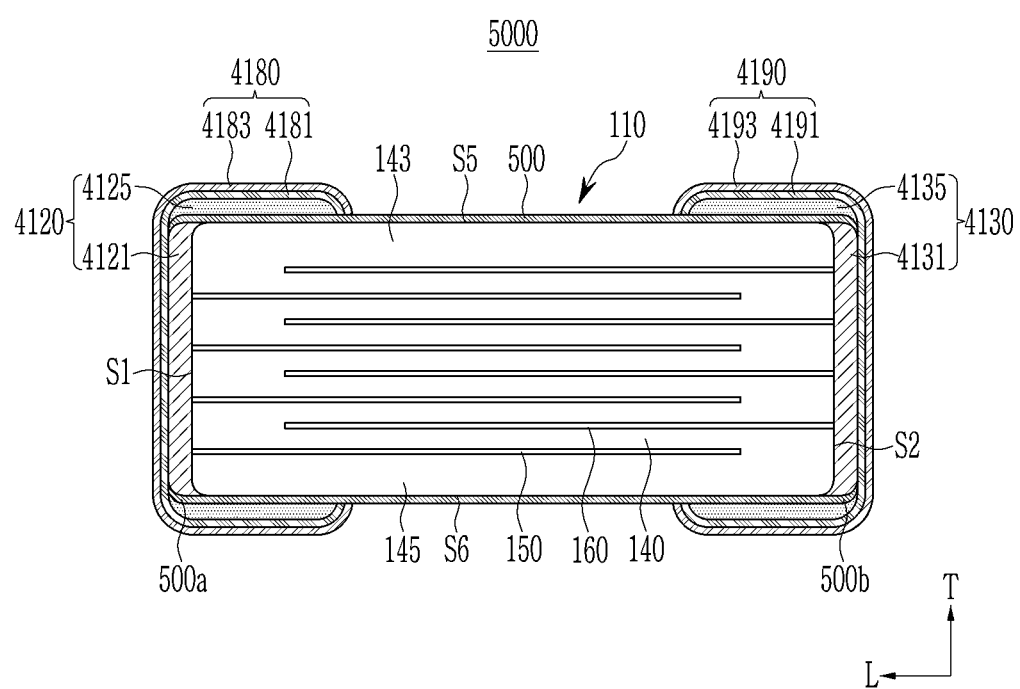
FIG. 9 is a cross-sectional view taken along line IX-IX' of FIG. 8.

FIG. 8 is a perspective view schematically showing a multilayer ceramic capacitor according to another embodiment, and FIG. 9 is a cross-sectional view taken along line IX-IX' of FIG. 8.

Referring to FIG. 8 and FIG. 9, the multilayer ceramic capacitor 5000 includes a ceramic main body 110, a first external electrode 4120, a second external electrode 4130, a plurality of first internal electrodes 150, a plurality of second internal electrodes 160, and a non-conductive resin layer 500. With the exception of the structure of the first external electrode 4120, the second external electrode 4130, and the non-conductive resin layer 500 of the multilayer ceramic capacitor 5000, the remaining components are the same as or correspond to the components of the multilayer ceramic capacitor 1000 of FIG. 1, so a repeated description thereof will be omitted.

The non-conductive resin layer 500 may be disposed on at least one of the third surface S3, the fourth surface S4, the fifth surface S5, or the sixth surface S6 of the ceramic main body 110.

The non-conductive resin layer 500 may include a first end portion 500a and a second end portion 500b opposing the first end portion 500a in the length direction (the L-axis direction).

The non-conductive resin layer 500 may cover entire portions of the third surface S3, the fourth surface S4, the fifth surface S5, and the sixth surface S6 of the ceramic main body 110.

The non-conductive resin layer 500 may be made of a material that is insulating and stretchable. For example, the non-conductive resin layer 500 may include various polymers that do not include a metal and have a low elastic modulus. Accordingly, the non-conductive resin layer 500 may have high elasticity. Therefore, when a drop impact or a flex stress (or a bending stress) of a mounting substrate occurs, the non-conductive resin layer 500 may absorb the stress so that occurrence of a flex crack in the multilayer ceramic capacitor is suppressed.

For example, a resin included in the non-conductive resin layer 500 may be various known thermosetting resins such as an epoxy resin, a phenol resin, a urethane resin, a silicon resin, a polyimide resin, and the like. It is preferable to use the epoxy resin which has excellent heat resistance, moisture resistance, adhesion, and the like.

The first external electrode 4120 may be disposed on the first surface S1 of the ceramic main body 110, and may extend onto at least one of the third surface S3, the fourth surface S4, the fifth surface S5, or the sixth surface S6. The second external electrode 4130 may be disposed on the second surface S2 of the ceramic main body 110, and may extend onto at least one of the third surface S3, the fourth surface S4, the fifth surface S5, or the sixth surface S6.

The first external electrode 4120 includes a first electrode layer 4121 and a first conductive resin layer 4125.

The first electrode layer 4121 covers the first surface S1 of the ceramic main body 110, and is electrically connected to the exposed ends of the plurality of first internal electrodes 150.

The first end portion 500a of the non-conductive resin layer 500 may be in contact with the first electrode layer 4121.

The first conductive resin layer 4125 covers a portion of the non-conductive resin layer 500.

The second external electrode 4130 includes a second electrode layer 4131 and a second conductive resin layer 4135.

The second electrode layer 4131 covers the second surface S2 of the ceramic main body 110, and is electrically connected to the exposed ends of the plurality of second internal electrodes 160.

The second end portion 500b of the non-conductive resin layer 500 may be in contact with the second electrode layer 4131.

The second conductive resin layer 4135 covers a portion of the non-conductive resin layer 500.

In the other embodiment described above, the non-conductive resin layer is divided into the first non-conductive resin layer included in the first external electrode and the second non-conductive resin layer included in the second external electrode, the first non-conductive resin layer covers a portion of a surface of the ceramic main body proximate to the first external electrode, and the second non-conductive resin layer covers a portion of a surface of the ceramic main body proximate to the second external electrode. Therefore, a ceramic surface between the first non-conductive resin layer and the second non-conductive resin layer is exposed.

However, the non-conductive resin layer 500 of the present embodiment is an integral resin layer, and may cover the third surface S3, the fourth surface S4, the fifth surface S5, and the sixth surface S6 of the ceramic main body 110. In other words, the non-conductive resin layer 500 may cover all of the outer surfaces except for the first surface S1 and the second surface S2 of the ceramic main body 110. Therefore, when a drop impact or a flex stress (or a bending stress) of a mounting substrate occurs, the non-conductive resin layer 500 may absorb the stress so that occurrence of a flex crack in the multilayer ceramic capacitor is better suppressed.

Meanwhile, the multilayer ceramic capacitor 5000 may further include a first plating layer 4180 and a second plating layer 4190.

Figure 10:
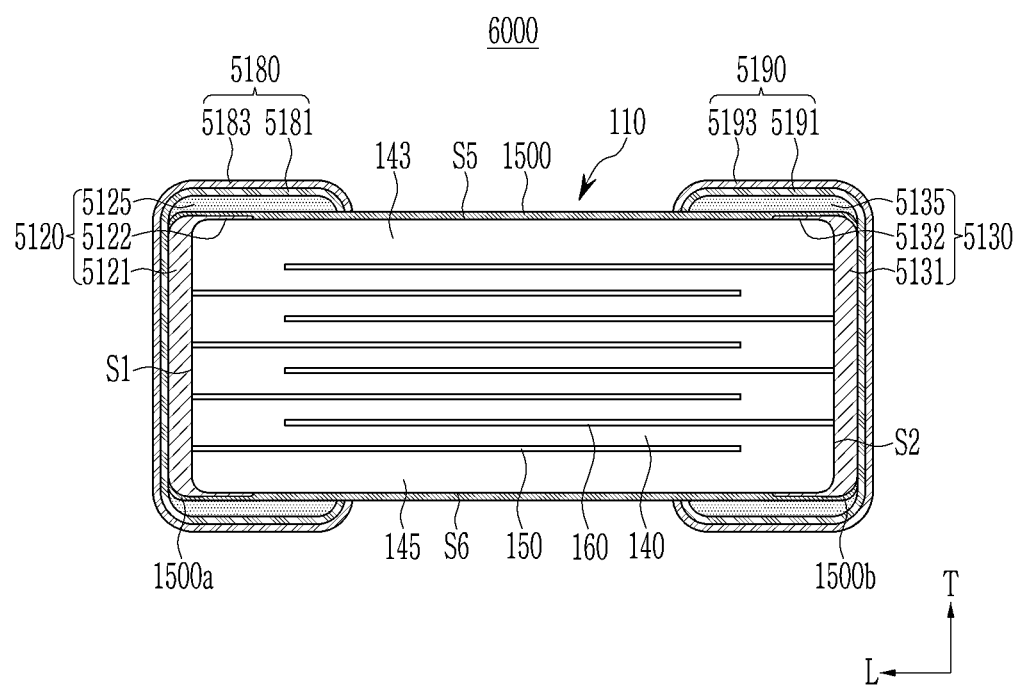
FIG. 10 is a cross-sectional view schematically showing a multilayer ceramic capacitor according to another embodiment.

FIG. 10 is a cross-sectional view schematically showing a multilayer ceramic capacitor according to another embodiment.

Referring to FIG. 10, the multilayer ceramic capacitor 6000 includes a ceramic main body 110, a first external electrode 5120, a second external electrode 5130, a plurality of first internal electrodes 150, a plurality of second internal electrodes 160, and a non-conductive resin layer 1500. With the exception of the structure of the first external electrode 5120, the second external electrode 5130, and the non-conductive resin layer 1500 of the multilayer ceramic capacitor 6000, the remaining components are the same as or correspond to the components of the multilayer ceramic capacitor 5000 of FIG. 8, so a repeated description thereof will be omitted.

The non-conductive resin layer 1500 may be disposed on at least one of the third surface S3, the fourth surface S4, the fifth surface S5, or the sixth surface S6 of the ceramic main body 110.

The non-conductive resin layer 1500 may include a first end portion 1500a and a second end portion 1500b opposing the first end portion 1500a in the length direction (the L-axis direction).

The non-conductive resin layer 1500 may be made of a material that is insulating and stretchable. For example, the non-conductive resin layer 1500 may include various polymers that do not include a metal and have a low elastic modulus. Accordingly, the non-conductive resin layer 1500 may have high elasticity. Therefore, when a drop impact or a flex stress (or a bending stress) of a mounting substrate occurs, the non-conductive resin layer 1500 may absorb the stress so that occurrence of a flex crack in the multilayer ceramic capacitor is suppressed.

For example, a resin included in the non-conductive resin layer 1500 may be various known thermosetting resins such as an epoxy resin, a phenol resin, a urethane resin, a silicon resin, a polyimide resin, and the like. It is preferable to use the epoxy resin which has excellent heat resistance, moisture resistance, adhesion, and the like.

The first external electrode 5120 may be disposed on the first surface S1 of the ceramic main body 110, and may extend onto at least one of the third surface S3, the fourth surface S4, the fifth surface S5, or the sixth surface S6. The second external electrode 5130 may be disposed on the second surface S2 of the ceramic main body 110, and may extend onto at least one of the third surface S3, the fourth surface S4, the fifth surface S5, or the sixth surface S6.

The first external electrode 5120 includes a first electrode layer 5121 and a first conductive resin layer 5125.

The first electrode layer 5121 covers the first surface S1 of the ceramic main body 110, and is electrically connected to the exposed ends of the plurality of first internal electrodes 150. The first electrode layer 5121 may further include a first extension portion 5122 disposed on at least one of the third surface S3, the fourth surface S4, the fifth surface S5, or the sixth surface S6 of the ceramic main body 110. That is, the first electrode layer 5121 may have a shape extending from the first surface S1 of the ceramic main body 110 to at least one of the third surface S3, the fourth surface S4, the fifth surface S5, or the sixth surface S6.

The non-conductive resin layer 1500 covers the first extension portion 5122 of the first electrode layer 5121, and covers portions of the third surface S3, the fourth surface S4, the fifth surface S5, and the sixth surface S6 of the ceramic main body 110. The first end portion 1500a of the non-conductive resin layer 1500 may cover the first extension portion 5122 of the first electrode layer 5121.

The first conductive resin layer 5125 covers a portion of the non-conductive resin layer 1500.

The second external electrode 5130 includes a second electrode layer 5131 and a second conductive resin layer 5135.

The second electrode layer 5131 covers the second surface S2 of the ceramic main body 110, and is electrically connected to the exposed ends of the plurality of second internal electrodes 160. The second electrode layer 5131 may further include a second extension portion 5132 disposed on at least one of the third surface S3, the fourth surface S4, the fifth surface S5, or the sixth surface S6 of the ceramic main body 110. That is, the second electrode layer 5131 may have a shape extending from the first surface S1 of the ceramic main body 110 to at least one of the third surface S3, the fourth surface S4, the fifth surface S5, or the sixth surface S6.

The second end portion 1500b of the non-conductive resin layer 1500 may cover the second extension portion 5132 of the second electrode layer 5131.

The second conductive resin layer 5135 covers a portion of the non-conductive resin layer 1500.

The non-conductive resin layer 1500 may be an integral resin layer, and may cover the third surface S3, the fourth surface S4, the fifth surface S5, and the sixth surface S6 of the ceramic main body 110. In other words, the non-conductive resin layer 1500 may cover all of the outer surfaces except for the first surface S1 and the second surface S2 of the ceramic main body 110.

Therefore, when a drop impact or a flex stress (or a bending stress) of a mounting substrate occurs, the non-conductive resin layer 1500 may absorb the stress so that occurrence of a flex crack in the multilayer ceramic capacitor is better suppressed.

Meanwhile, the multilayer ceramic capacitor 6000 may further include a first plating layer 5180 and a second plating layer 5190.

Experimental Example 1

Figure 11:
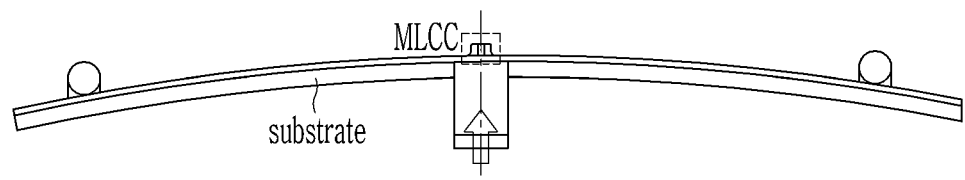
FIG. 11 is a view describing a bending test method of the multilayer ceramic capacitor.
Figure 12:
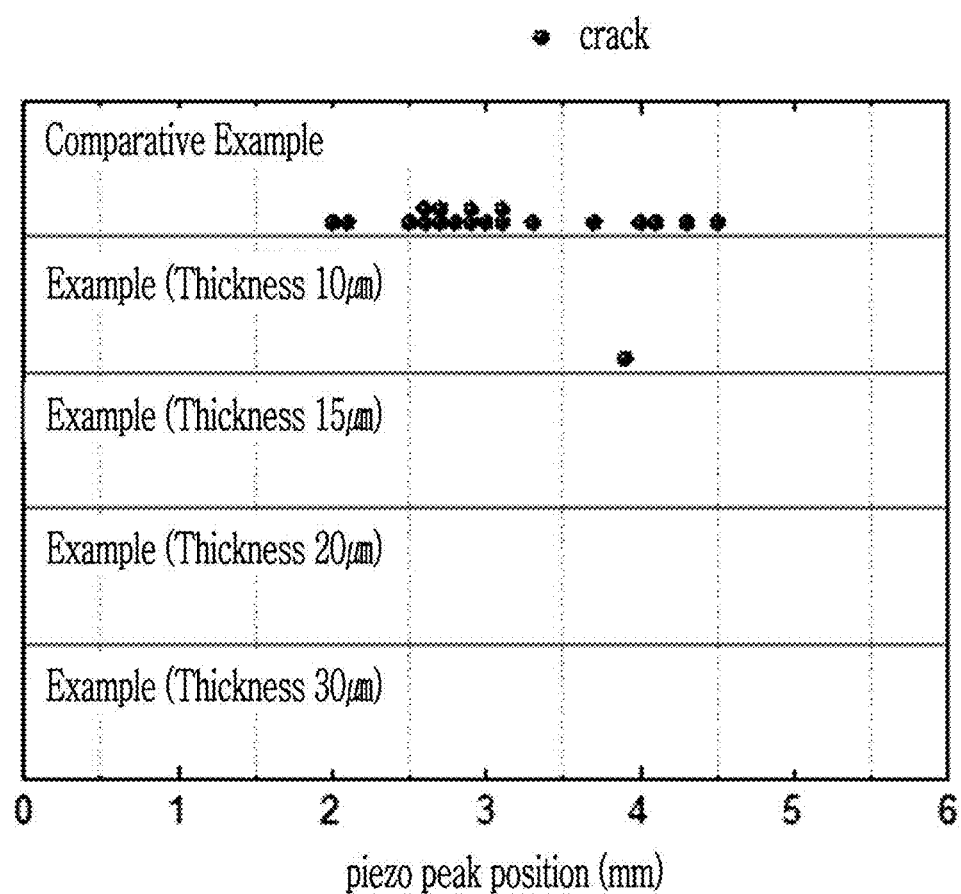
FIG. 12 is a graph showing a result of a bending test using the test method of FIG. 11.

FIG. 11 is a view describing a bending test method of the multilayer ceramic capacitor, and FIG. 12 is a graph showing a result of a bending test using the test method of FIG. 11.

FIG. 11 and FIG. 12 show a test of a frequency of crack occurrence in the ceramic main body of the multilayer ceramic capacitor depending on whether the non-conductive resin layer and the conductive resin layer are applied.

Here, Comparative Example is a multilayer ceramic capacitor in which a non-conductive resin layer and a conductive resin layer are not applied to an external electrode, and Example is a multilayer ceramic capacitor in which the external electrode shown in FIG. 1 includes the non-conductive resin layer and the conductive resin layer and has a thickness of 10, 15, 20, or 30 μm.

Referring to FIG. 11. the multilayer ceramic capacitor mounted on a substrate is placed in a device capable of pressing on the mounting surface, and the frequency of crack occurrence can be measured by pressing down on the opposite side of the mounting surface of the multilayer ceramic capacitor by 6 mm to check whether a flex crack occurs.

Referring to FIG. 12, for the Comparative Example in which the non-conductive resin layer and the conductive resin layer are not applied, 19 out of 30 samples had a peel-off defect, where the external electrode peels off from the ceramic main body, or a crack defect, where the ceramic main body breaks.

However, for the Example in which the non-conductive resin layer and the conductive resin layer are applied, out of 30 samples, only one sample with a thickness of 10 μm failed, and it can be confirmed that the bending strength (or a flex strength) can be guaranteed during a bending strength test (or a flex strength test) of 6 mm.

Experimental Example 2

Figure 13:
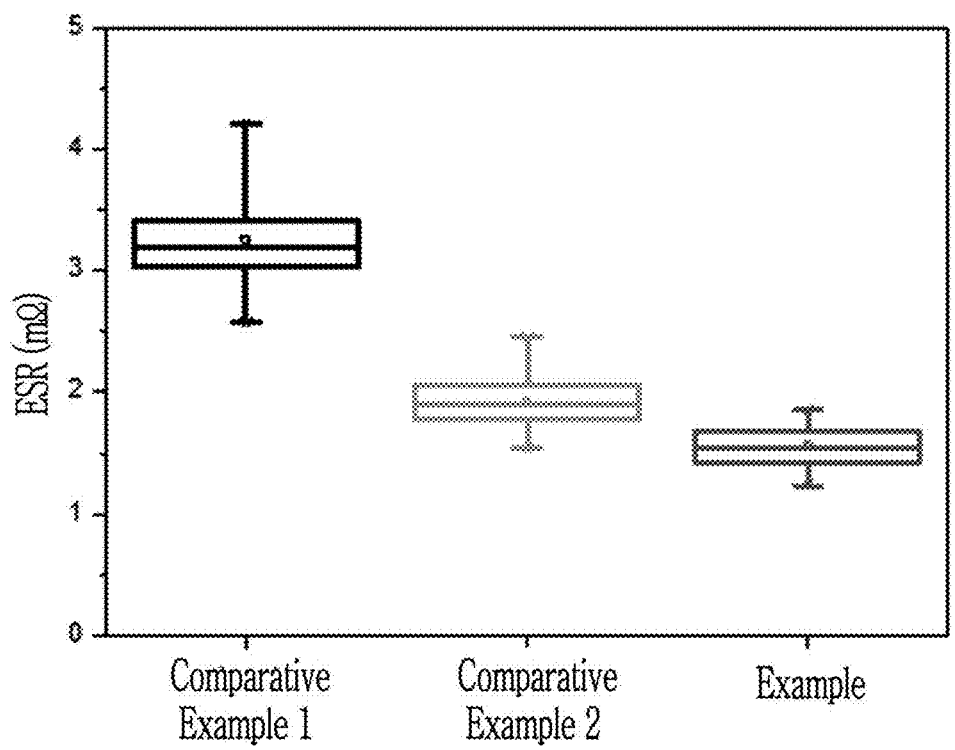
FIG. 13 is a graph comparing equivalent series resistance (ESR) of the embodiment with equivalent series resistance (ESR) of Comparative Examples 1 and 2.

FIG. 13 is a graph comparing equivalent series resistance (ESR) of the Example with equivalent series resistance (ESR) of Comparative Examples 1 and 2.

Example is the multilayer ceramic capacitor of FIG. 1 where the external electrode on the first and second surfaces of the ceramic main body includes the electrode layer and the plating layer.

Comparative Example 1 is a multilayer ceramic capacitor in which an external electrode on first and second surfaces of a ceramic main body includes an electrode layer, a conductive resin layer (epoxy including copper), and a plating layer.

Comparative Example 2 is a multilayer ceramic capacitor in which an external electrode on first and second surfaces of a ceramic main body includes an electrode layer, a conductive resin layer (epoxy including intermetallic compounds), and a plating layer.

Referring to FIG. 13, the equivalent series resistance (ESR) of the Example is lower than that of Comparative Examples 1 and 2. This is because electrical connectivity is improved by forming the plating layer directly on the electrode layer on the first and second surfaces of the ceramic main body without placing the resin layer on the electrode layer on the first and second surfaces of the ceramic main body.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A multilayer ceramic capacitor, comprising:
   a ceramic main body that includes a first surface and a second surface facing in a first direction, a third surface and a fourth surface facing in a second direction and connecting the first surface and the second surface, and a fifth surface and a sixth surface facing in a third direction and connecting the first surface and the second surface;
   a plurality of first internal electrodes and a plurality of second internal electrodes that are disposed inside the ceramic main body;
   a first external electrode and a second external electrode that are disposed outside the ceramic main body;
   a first plating layer covering at least a portion of the first external electrode; and
   a second plating layer covering at least a portion of the second external electrode,
   wherein the first external electrode includes: a first electrode layer disposed on the first surface of the ceramic main body and electrically connected to the plurality of first internal electrodes, a first non-conductive resin layer disposed on at least one of the third surface, the fourth surface, the fifth surface, or the sixth surface of the ceramic main body and in contact with the first electrode layer, and a first conductive resin layer covering at least a portion of the first non-conductive resin layer,
   wherein the second external electrode includes: a second electrode layer disposed on the second surface of the ceramic main body and electrically connected to the plurality of second internal electrodes, a second non-conductive resin layer disposed on at least one of the third surface, the fourth surface, the fifth surface, or the sixth surface of the ceramic main body and in contact with the second electrode layer, and a second conductive resin layer covering at least a portion of the second non-conductive resin layer, and
   wherein the first plating layer directly contacts the first electrode layer, and the second plating layer directly contacts the second electrode layer.

2. The multilayer ceramic capacitor of claim 1, wherein the first non-conductive resin layer includes a first end portion in contact with the first electrode layer, and a second end portion opposing the first end portion in the first direction, and
   the second non-conductive resin layer includes a third end portion in contact with the second electrode layer, and a fourth end portion opposing the third end portion in the first direction.

3. The multilayer ceramic capacitor of claim 2, wherein the first conductive resin layer covers the first end portion and the second end portion of the first non-conductive resin layer, and
   the second conductive resin layer covers the third end portion and the fourth end portion of the second non-conductive resin layer.

4. The multilayer ceramic capacitor of claim 2, wherein
the first conductive resin layer covers the first end portion of the first non-conductive resin layer and exposes the second end portion, and
the second conductive resin layer covers the third end portion of the second non-conductive resin layer and exposes the fourth end portion.

5. The multilayer ceramic capacitor of claim 4, wherein
a length of the first non-conductive resin layer is greater than a length of the first conductive resin layer, and
a length of the second non-conductive resin layer is greater than a length of the second conductive resin layer.

6. The multilayer ceramic capacitor of claim 1, wherein
the first electrode layer further includes a first extension portion disposed on at least one of the third surface, the fourth surface, the fifth surface, or the sixth surface of the ceramic main body, and
the second electrode layer further includes a second extension portion disposed on at least one of the third surface, the fourth surface, the fifth surface, or the sixth surface of the ceramic main body.

7. The multilayer ceramic capacitor of claim 6, wherein
the first extension portion is covered by the first non-conductive resin layer, and
the second extension portion is covered by the second non-conductive resin layer.

8. The multilayer ceramic capacitor of claim 6, wherein
the first non-conductive resin layer includes a first end portion in contact with the first electrode layer, and a second end portion opposing the first end portion in the first direction, and
the second non-conductive resin layer includes a third end portion in contact with the second electrode layer, and a fourth end portion opposing the third end portion in the first direction.

9. The multilayer ceramic capacitor of claim 8, wherein
the first conductive resin layer covers the second end portion of the first non-conductive resin layer, and
the second conductive resin layer covers the fourth end portion of the second non-conductive resin layer.

10. The multilayer ceramic capacitor of claim 8, wherein
the first conductive resin layer exposes the second end portion of the first non-conductive resin layer, and
the second conductive resin layer exposes the fourth end portion of the second non-conductive resin layer.

11. The multilayer ceramic capacitor of claim 8, wherein
a length of the first non-conductive resin layer is greater than a length of the first conductive resin layer, and
a length of the second non-conductive resin layer is greater than a length of the second conductive resin layer.

12. The multilayer ceramic capacitor of claim 1, wherein
the first electrode layer includes copper (Cu) or nickel (Ni), and
the second electrode layer includes copper (Cu) or nickel (Ni).

13. The multilayer ceramic capacitor of claim 1, wherein
the first non-conductive resin layer includes epoxy, and
the second non-conductive resin layer includes epoxy.

14. The multilayer ceramic capacitor of claim 1, wherein
the first conductive resin layer includes a conductive metal and epoxy, and
the second conductive resin layer includes a conductive metal and epoxy.

15. The multilayer ceramic capacitor of claim 1, wherein
the first conductive resin layer includes an intermetallic compound and epoxy, and
the second conductive resin layer includes an intermetallic compound and epoxy.

16. The multilayer ceramic capacitor of claim 1, wherein
the first plating layer includes a first layer disposed on the first external electrode and a second layer disposed on the first layer, and
the second plating layer includes a third layer disposed on the second external electrode and a fourth layer disposed on the third layer.

17. The multilayer ceramic capacitor of claim 16, wherein
the first layer and the third layer include nickel (Ni), and
the second layer and the fourth layer include tin (Sn).

18. A multilayer ceramic capacitor, comprising:
a ceramic main body that includes a first surface and a second surface facing in a first direction, a third surface and a fourth surface facing in a second direction and connecting the first surface and the second surface, and a fifth surface and a sixth surface facing in a third direction and connecting the first surface and the second surface;
a plurality of first internal electrodes and a plurality of second internal electrodes that are disposed inside the ceramic main body;
a non-conductive resin layer that is disposed on at least one of the third surface, the fourth surface, the fifth surface, or the sixth surface of the ceramic main body;
a first external electrode and a second external electrode that are disposed outside the ceramic main body;
a first plating layer covering at least a portion of the first external electrode; and
a second plating layer covering at least a portion of the second external electrode,
wherein the first external electrode includes: a first electrode layer disposed on the first surface of the ceramic main body and electrically connected to the plurality of first internal electrodes, and a first conductive resin layer covering at least a portion of the non-conductive resin layer,
wherein the second external electrode includes: a second electrode layer disposed on the second surface of the ceramic main body and electrically connected to the plurality of second internal electrodes, and a second conductive resin layer covering at least a portion of the non-conductive resin layer, and
wherein the first plating layer directly contacts the first electrode layer, and the second plating layer directly contacts the second electrode layer.

19. The multilayer ceramic capacitor of claim 18, wherein
the first electrode layer further includes a first extension portion disposed on at least one of the third surface, the fourth surface, the fifth surface, or the sixth surface of the ceramic main body and covered by the non-conductive resin layer, and
the second electrode layer further includes a second extension portion disposed on at least one of the third surface, the fourth surface, the fifth surface, or the sixth surface of the ceramic main body and covered by the non-conductive resin layer.

20. A multilayer ceramic capacitor, comprising:
a ceramic main body that includes a first surface and a second surface facing in a first direction, a third surface and a fourth surface facing in a second direction and connecting the first surface and the second surface, and a fifth surface and a sixth surface facing in a third direction and connecting the first surface and the second surface;

a plurality of first internal electrodes and a plurality of second internal electrodes that are disposed inside the ceramic main body; and a first external electrode and a second external electrode that are disposed outside the ceramic main body, wherein the first external electrode includes: a first electrode layer disposed on the first surface of the ceramic main body and electrically connected to the plurality of first internal electrodes, a first non-conductive resin layer disposed on at least one of the third surface, the fourth surface, the fifth surface, or the sixth surface of the ceramic main body and in contact with the first electrode layer, and a first conductive resin layer covering at least a portion of the first non-conductive resin layer, wherein the second external electrode includes: a second electrode layer disposed on the second surface of the ceramic main body and electrically connected to the plurality of second internal electrodes, a second non-conductive resin layer disposed on at least one of the third surface, the fourth surface, the fifth surface, or the sixth surface of the ceramic main body and in contact with the second electrode layer, and a second conductive resin layer covering at least a portion of the second non-conductive resin layer, and each of the first and second conductive resin layers directly contacts at least one of the third, fourth, fifth, or sixth surface of the ceramic main body.

* * * * *